United States Patent
Desmond et al.

(10) Patent No.: US 8,335,503 B1
(45) Date of Patent: Dec. 18, 2012

(54) FEMTOCELL HOPPING PILOT BEACON OPTIMIZATION

(75) Inventors: Christopher Michael Desmond, Yardley, PA (US); Alicia Lauren Aull, Bedminster, NJ (US); Charles Albert Sanders, Bridgewater, NJ (US); Michael Kearns, Bethlehem Township, PA (US); Eugene A. Carucci, Oxford, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 772 days.

(21) Appl. No.: 12/390,755

(22) Filed: Feb. 23, 2009

(51) Int. Cl.
*H04W 24/00* (2009.01)

(52) U.S. Cl. ........ 455/422.1; 455/63.3; 455/62; 455/71; 455/113; 455/150.1; 455/161.1; 455/182.1; 455/190.1; 455/154.1; 370/343; 370/330; 370/302

(58) Field of Classification Search .............. 455/422.1, 455/62, 71, 63.3, 113, 150.1, 154.1, 161.1, 455/182.1, 190.1; 370/343, 330, 302
See application file for complete search history.

(56) References Cited

U.S. PATENT DOCUMENTS

| | | | |
|---|---|---|---|
| 5,513,184 A | 4/1996 | Vannucci | |
| 5,864,549 A | 1/1999 | Honkasalo et al. | |
| 5,974,308 A | 10/1999 | Vedel | |
| 6,101,176 A | 8/2000 | Honkasalo et al. | |
| 6,970,719 B1 | 11/2005 | McConnell et al. | |
| 7,848,302 B1 * | 12/2010 | Talley et al. | 370/342 |
| 7,929,970 B1 * | 4/2011 | Gunasekara et al. | 455/444 |
| 7,974,653 B1 * | 7/2011 | Yenney et al. | 455/522 |
| 2002/0032034 A1 | 3/2002 | Tiedemann, Jr. et al. | |
| 2002/0151308 A1 | 10/2002 | Baba et al. | |
| 2003/0148774 A1 | 8/2003 | Naghian et al. | |
| 2003/0231586 A1 | 12/2003 | Chheda | |
| 2004/0204097 A1 | 10/2004 | Scheinert et al. | |
| 2005/0059390 A1 | 3/2005 | Sayers et al. | |
| 2006/0111110 A1 | 5/2006 | Schwarz et al. | |
| 2006/0160565 A1 | 7/2006 | Singh et al. | |
| 2006/0215609 A1 | 9/2006 | Kyung et al. | |

(Continued)

FOREIGN PATENT DOCUMENTS

EP    1 099 357 B1    12/2006

OTHER PUBLICATIONS

"WCDMA Ubicell Benefits," http://www.samsungnetwork.com, retrieved Jul. 18, 2007.

(Continued)

*Primary Examiner* — Kamran Afshar
*Assistant Examiner* — Khalid Shaheed

(57) ABSTRACT

In an idle state transition from a macro mobile network to a femtocell, a mobile station looks for the femtocell to operate in a frequency band typically assigned to a macro network. For normal macro network operations, mobile stations look for base stations operating on various channels, e.g. based on hashing of respective mobile station identifiers. Femtocells generate a pilot beacon on a carrier frequency to enable mobile station acquisition, e.g. to redirect a mobile station to the operating frequency of the femtocell. To avoid the need to continually cycle or hop through all possible macro assigned carrier frequencies, pilot beacon transmissions of a particular femtocell are prioritized to correspond to the mobile station(s) expected to utilize that femtocell, e.g. by using existing network information, provisioning device information or self learning/calculating information regarding the carrier most likely to be used by any particular mobile station expected to use the femtocell.

23 Claims, 6 Drawing Sheets

U.S. PATENT DOCUMENTS

2006/0251008 A1* 11/2006 Wu et al. ............... 370/328
2007/0155421 A1 7/2007 Alberth et al.
2008/0009286 A1 1/2008 Hur et al.

OTHER PUBLICATIONS

Thadasina, "CDMA2000 1X Femtocell Challenges Associated w/Underlay Deployments," CDG Technology Forum, Dallas, Texas, May 2, 2007.

"Femto Cells: Personal Base Stations," Airvana, Chelmsford, MA.

"Samsung Introduces CDMA Base Station for Home Coverage at CTIA," Samsung Telecommunications America, LLC, Mar. 26, 2007.

"Your own mobile base station for home," inbabble.com, Feb. 10, 2007.

U.S. Appl. No. 11/892,330, Bao, D., et al., "Femto-BTS RF access mechanism," filed Aug. 22, 2007.

U.S. Appl. No. 11/896,160, Chen, X., et al., "Pico Cell Home Mode Operation," filed Aug. 30, 2007.

U.S. Appl. No. 11/896,355, Bao, D., et al., "Active service redirection for a private femto cell," filed Aug. 31, 2007.

International Search Report issued in International Patent Application No. PCT/US2008/072882 dated on Nov. 5, 2008.

International Search Report issued in International Patent Application No. PCT/US2008/072886, dated on Nov. 5, 2008.

International Search Report issued in International Patent Application No. PCT/US2008/072871, dated on Nov. 5, 2008.

Thornycroft, P., "Running for Coverage: A Review of Femtocells", 2008, Aruba Networks.

"Base Station Router Femto", Alcatel-Lucent.

"FemtoCell—Frequently Asked Questions—Dec. 15, 2008", VZW-Network Extender Network Implementation V1.0.

* cited by examiner

Example
- Mobile idles on carrier F2 based upon MIN / ESN hashing
- Mobile finds femtocell hopping pilot beacon on F2
- Performs idle handoff to femtocell
- Femtocell redirects mobile to carrier licensed clear channel F11
- Mobile operates on F11 of the femtocell Example Registration Message:

16:18:27.144 Access Channel: Registration
ACK_SEQ: 7 MSG_SEQ: 1 ACK_REQ: 1 VALID_ACK: 0
ACK_TYPE: 0
MSID_TYPE: 3, ESN: [0x 01 99 0d fc]
MFR 1, Reserved 38, Serial Number 69116,
IMSI: (Class: 0, Class_0_type: 1) [0x 01 8d 31 74 29 36]
00-111-555-1212
AUTH_MODE: 0
REG_TYPE: Timer-based
SLOT_CYCLE_INDEX: 2
MOB_P_REV: 1
EXT_SCM: 1
SLOTTED_MODE: 1
MOB_TERM: 1

FEMTOCELL HOPPING PILOT BEACON OPTIMIZATION

TECHNICAL FIELD

The present subject matter relates to techniques and equipment to optimize beacon transmissions by a femtocell, based on the mobile station or stations expected to utilize the femtocell.

BACKGROUND

In recent years, use of mobile communications devices for voice telephone services, email or text messaging services and even multi-media service has become commonplace, among mobile professionals and throughout the more general consumer population. Mobile service provided through public cellular or PCS (personal communication service) type networks, particularly for voice telephone service, has become virtually ubiquitous across much of the world. In the USA, for example, competing public networks today provide mobile communications services covering most if not all of the geographic area of the country.

In addition to public networks, similar wireless technologies have provided relatively small scale networks for enterprise applications, typically offering wireless service analogous to private branch exchange (PBX) type service. Such a smaller scale private system includes several base stations, similar to but scaled down from those used in the public networks, in combination with a private circuit switch or more recently an Internet Protocol (IP) router or network, for providing communications between devices and with external networks. U.S. Pat. No. 6,970,719 to McConnell et al. and US application publication no. 2005/0059390 to Sayers et al. disclose examples of such private wireless cell phone networks. Although sometimes referred to as an "indoor cellular network" or "indoor system," such enterprise systems need not be literally indoors and for example may offer coverage across an entire campus area. Alternatively, such an enterprise cellular communication system may be referred to as a "picocell" system, with the outdoor public cellular communication system covering a wider area being referred to as a "macrocell" system.

As broadband IP connectivity to homes and offices has become more common, and the speeds of packet-switched communications equipment and the speed of processors have increased, a variety of applications have emerged that utilize IP packet transport as an alternative bearer for voice communications. Generally, such applications are referred to as voice-over packet services, however, the common forms based on Internet Protocol (IP) are referred to as "Voice over IP" or "VoIP" services. Although originally developed for wireline network transport through the Internet and through wireline intranets, VoIP services are now migrating to the wireless domain. Picocell systems, which use IP routing or frame switching for IP transport, utilize VoIP technology to support the voice services.

As an extension of these developments/deployments into the customer premises, particularly for residential or small business applications, equipment manufacturers have recently begun offering "femtocell" devices, e.g. for home installation. A "femtocell" system is a base transceiver system (BTS) forming a compact base station. In most recent examples, such compact base stations are equipped with VoIP capability and an IP interface, for example, for connection to a Fiber Optic Service (FiOS) modem, to a digital subscriber line (DSL) modem or to a cable modem. One such unit in a home or small business, for example, would allow mobile station users in the premises to make and receive calls via the existing broadband wireline service from the customer's Internet Service Provider (ISP), without consuming air-time minutes for wireless service that otherwise would use the public network of their mobile/wireless service provider.

It has been suggested that the deployment of femtocells will be particularly advantageous to a service provider as a way to improve service of the service provider's macro network in customer premises locations where the macro network service is less than optimum. For example, if a mobile station user may have weak coverage at his or her residence, installation of femtocell type BTS in the home effectively extends macro cell mobile network coverage into the home in a manner that substantially improves the customer's experience using the service provider's network.

At present, plans therefore are for the public mobile service provider(s) to distribute (sell or lease) the femtocell equipment to their public network customers. The femtocell is intended to work with a regular mobile station. To the mobile station, the BTS of such a femtocell appears like a normal base station of the public network. Deployment of femtocells, particularly in large numbers of customer premises, requires coordination with networks of the applicable public mobile service providers, which raises issues for such a service provider. One such problem relates to frequencies of femto operation, particularly in a manner that allows mobile stations to easily find and access the femtocell.

For example, femtocells may operate on frequencies other than those that the mobile service provider uses in the surrounding macro network region. Hence, the femtocell will need to direct mobile devices of the service provider's customers onto the traffic bearing carrier on a frequency band of femtocell operation. One approach employs a "beacon" signal on a pilot channel to serve as a trigger to the mobile station. Essentially, the femtocell broadcasts the pilot on a macro network frequency carrier; and the beacon on the pilot channel directs a mobile station that attempts to acquire service through the femtocell over to the frequency that the femtocell uses for its traffic functions.

Hence, for a public mobile service provider deployment, femtocells that the service provider provides to its customers are configured to operate such beacons on the provider's own licensed frequencies. In a heavily populated area, a major mobile service provider will have licensed substantial portions of the spectrum for its uses. To allow mobile stations to find, lock-on and register through network base stations, the network base stations broadcast in the region may operate on any number of channels. In some areas, base stations of a major service provider such as Verizon Wireless may broadcast pilot channels on ten or more different frequencies. In operation, each mobile station runs an algorithm to help it quickly find a preferred one of the service provider's pilot channels, for example, by selecting a pilot frequency from among the service provider's pilot frequencies based on a hash of the mobile identification number (MIN) that the provider has assigned to the mobile station. Numerous mobile stations seeking access through femtocells therefore may be looking for a relatively large number of different preferred pilot channel frequencies.

Although a mobile station may be able to search for other channel frequencies, in the event that it fails to detect the preferred channel frequency, the requisite searching may take a relatively long time during which the mobile station is without network service. To facilitate fast access to a femtocell, it has been suggested that each femtocell could provide a means to broadcast on all of the service provider's pilot channels, so as to allow mobile stations to find the femtocells. For example, in a network with spectrum to support ten carriers, present technology describes a process in which the femtocell generates a pilot beacon on each of the ten carriers, in sequence, based on provisioning the femtocell to identify the appropriate carriers. These pilot beacon carriers are utilized to direct an approaching mobile device towards a dedicated frequency channel and carrier for localized use in the coverage area of the particular femtocell. In operation, the femtocell transmits a pilot beacon on one carrier for a short period of time, then transitions to the next carrier, and so on, in such a manner that the femtocell cycles through all ten carriers repeatedly. Stated another way, the femtocell sequentially "hops" through the appropriate macro-network carrier frequencies for its pilot beacon transmissions. Carrier generation, as well as the time for transmission on each frequency and the time to cycle through all carrier frequencies for re-transmission of a given pilot channel carrier frequency, will vary depending upon the number of carriers that the femtocell is required to support in any given area and/or for a particular service provider's customers.

Depending upon the spectrum owned by a network provider, the number of macro-network service providers present in the public network can be quite large. Hence, it is expected that the number of beacons a femtocell would be expected to generate would match the macro-network carrier list, and as such be equally large. Cycling through so many carriers, in the designated frequency hopping sequence, is inefficient. The requirement to generate, transmit and cyclically regenerate a large number of carriers, induces a system acquisition time lag component into the ability of an approaching mobile device to "find" the femtocell and "lock on" to it for service. For example, the femtocell broadcasts the pilot beacon on any one carrier only for a small percentage of the time, approximately 10% in our ten carrier example. A mobile station entering the coverage area of the femtocell may not detect its preferred pilot frequency for a considerable period, while the femtocell is cycling through the other carriers. Also, if there is some interference during the first broadcast on the preferred carrier, the mobile station may have to wait through one or more additional long cycles until adequate reception on the appropriate pilot carrier frequency. During the time between leaving the macro-network service and "finding" the femtocell, the mobile device would indicate "no-service."

Hence a need exists for a technique to improve or optimize pilot transmission time and cycle for re-transmission time if needed for pilot channels for idle state acquisition of femtocells by mobile stations.

SUMMARY

The teachings herein provide an improvement over existing femtocell operation, particularly as related to the techniques for broadcasting a pilot channel for idle state femtocell acquisition by a mobile station on one or more frequencies. In the examples discussed in the detailed description, pilot generation and transmission time and cycle for re-transmission time could be improved by limiting the number of carriers required to be generated to the one or a small number of carriers used by the mobile devices typically expected to utilize a particular femtocell. For example, by using existing network information, provisioning device information or self learning/calculating information regarding the carrier most likely to be used by any given mobile device expected to use the particular femtocell, the femtocell algorithm to generate carriers and transmit them could be optimized to only generate the carrier(s) used by specific mobile device(s) anticipated to use the cell. Limiting the number of carrier frequencies in the hopping sequence for pilot beacon transmission increases the amount of time that there is a pilot beacon on each carrier frequency and/or reduces the time to cycle through a complete hopping sequence, which reduces the amount of time required for a mobile device to find the femtocell pilot beacon and for the femtocell to direct the mobile device on to the desired femtocell channel and carrier. If the femtocell should support acquisition by other mobile stations (not normally expected to utilize the femtocell), the femtocell could occasionally cycle through all of the carriers; however, most of the time the pilot beacon transmissions would be optimized for the mobile station or stations expected to utilize the particular femtocell.

A disclosed method for example relates to operating a femtocell on a premises of a customer of a mobile network service provider operating a public macro mobile communication network. The femtocell is configured to be able to broadcast a pilot beacon signal on each of a plurality of carrier frequencies used for pilot channels by base stations of a region of the public macro mobile communication network including the customer premises. The method involves identifying one or more mobile stations of a customer of the service provider, as a mobile station expected to utilize the femtocell. A sequence of hopping through the carrier frequencies for transmission of pilot beacon signals by the femtocell is prioritized, based on the identification of the mobile station or stations expected to utilize the femtocell.

The method may relate to a case where only one mobile station is expected to utilize the femtocell. In such a case, the prioritizing step limits pilot beacon signal transmissions from the femtocell to only one of the carrier frequencies, specifically, to the one carrier frequency corresponding to the one identified mobile station.

In other cases, a plurality of mobile stations are expected to utilize the femtocell. In that event, the prioritizing involves identifying one or more of the carrier frequencies as corresponding to the identified mobile stations, typically based on the mobile station identifiers. The femtocell can then limit its pilot beacon signal transmissions to only the one or more identified carrier frequencies corresponding to the identified mobile stations.

In the multiple mobile station case, the expected mobile stations could utilize or look for only one frequency for the pilot signal transmissions. However, often, the multiple expected mobile stations will look for some number (but not all) of the frequencies for the pilot signal transmissions. In this later situation, identified carrier frequencies corresponding to the identified mobile stations include some but not all of the carrier frequencies used for pilot channels by base stations of the region of the public macro mobile communication network. Hence, the step of limiting pilot beacon signal transmissions involves repeatedly cycling through the identified plurality of carrier frequencies in sequence to transmit pilot beacon signals on the identified carrier frequencies, without transmitting a pilot beacon signal on any other of the carrier frequencies used for pilot channels by base stations of the region of the public macro mobile communication network.

In methods such as outlined above, pilot beacon transmissions from the femtocell are normally optimized for the one or more mobile stations expected to use the particular femtocell, by provisioning the relevant pilot frequency identification(s) into the femtocell, e.g. based on mobile station identification(s). If it is desirable to limit mobile station access, the femtocell may operate only in this optimized mode. In some scenarios, for example, this will deliver aspects of system security in that once the pilot beacon broadcast set is optimized via the methodology discussed above, a single or smaller set of carrier beacons will be broadcast to the outside world. This renders the femtocell somewhat hidden or shielded from detection by random user mobile station devices that normally look for other frequencies.

However, there may be other situations in which it is desirable to make the femtocell somewhat more readily accessible to other user mobile station devices. For such situations, the femtocell might temporarily interrupt the repeated cycling or hopping through the identified one or more carrier frequencies for its pilot beacon signal transmission. Typically, such an interruption would be somewhat cyclical although on a relatively infrequent basis compared to the cycle/repetition rate of the optimized hopping sequence. During the interruption, however, the femtocell could cycle through a plurality of carrier frequencies in sequence to transmit pilot beacon signals thereon, including on each other one of the carrier frequencies used for pilot channels by base stations of the region of the public macro mobile communication network.

The methods outlined above rely on provisioning information into the femtocell for use in optimizing pilot beacon transmissions from the femtocell. The provisioning may involve input of the actual frequencies. Alternatively, the provisioning involves identification of one or more expected mobile stations and processing of the identification information for the mobile stations to identify one or more corresponding frequencies for the prioritized pilot beacon signal transmissions. The mobile station identification may be done at the premises or via the public network. Those skilled in the art will recognize that there are many ways to input the relevant information to the femtocell. Several examples are disclosed herein.

For example, the provisioning of the femtocell might involve receiving a customer input of each respective mobile station identifier, and storing each received mobile station identifier in the femtocell. In another provisioning approach, the femtocell might receive each respective mobile station identifier as part of a data communication from a data system of the mobile network service provider, and store received mobile station identifier. Identification of the frequency or frequencies could also be input by the service provider.

The disclosure below also suggests an automatic provisioning approach in which the femtocell essentially 'learns' the station identifier(s). In such an approach, the femtocell automatically detects each respective mobile station identifier from signals communicated over-the-air by each respective one of the one or more mobile stations. The femtocell then can maintain a list of the one or more detected mobile station identifiers in storage in the femtocell. Hashing of each identifier then identifies the corresponding frequency.

The present concepts also encompass femtocells programmed or otherwise configured to provide pilot beacon signal transmission optimized for one or more identified mobile stations, such as might implement a prioritized transmission technique of the type outlined above.

Other concepts relate to unique software or programming for implementing the optimized pilot beacon signal transmission techniques. A program product, in accord with this type of concept, includes at least one machine-readable medium and information or programming embodied in the medium. The information or programming carried by the medium may be executable code, but may also include one or more databases and/or information regarding one or more mobile station identifiers, for controlling pilot beacon transmissions from a femtocell in the manner described herein.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to prioritizing or optimizing pilot beacon transmissions by a femtocell, based on the mobile station or stations expected to utilize the femtocell. Reference now is made in detail to the examples illustrated in the accompanying drawings and discussed below.

Figure 1:
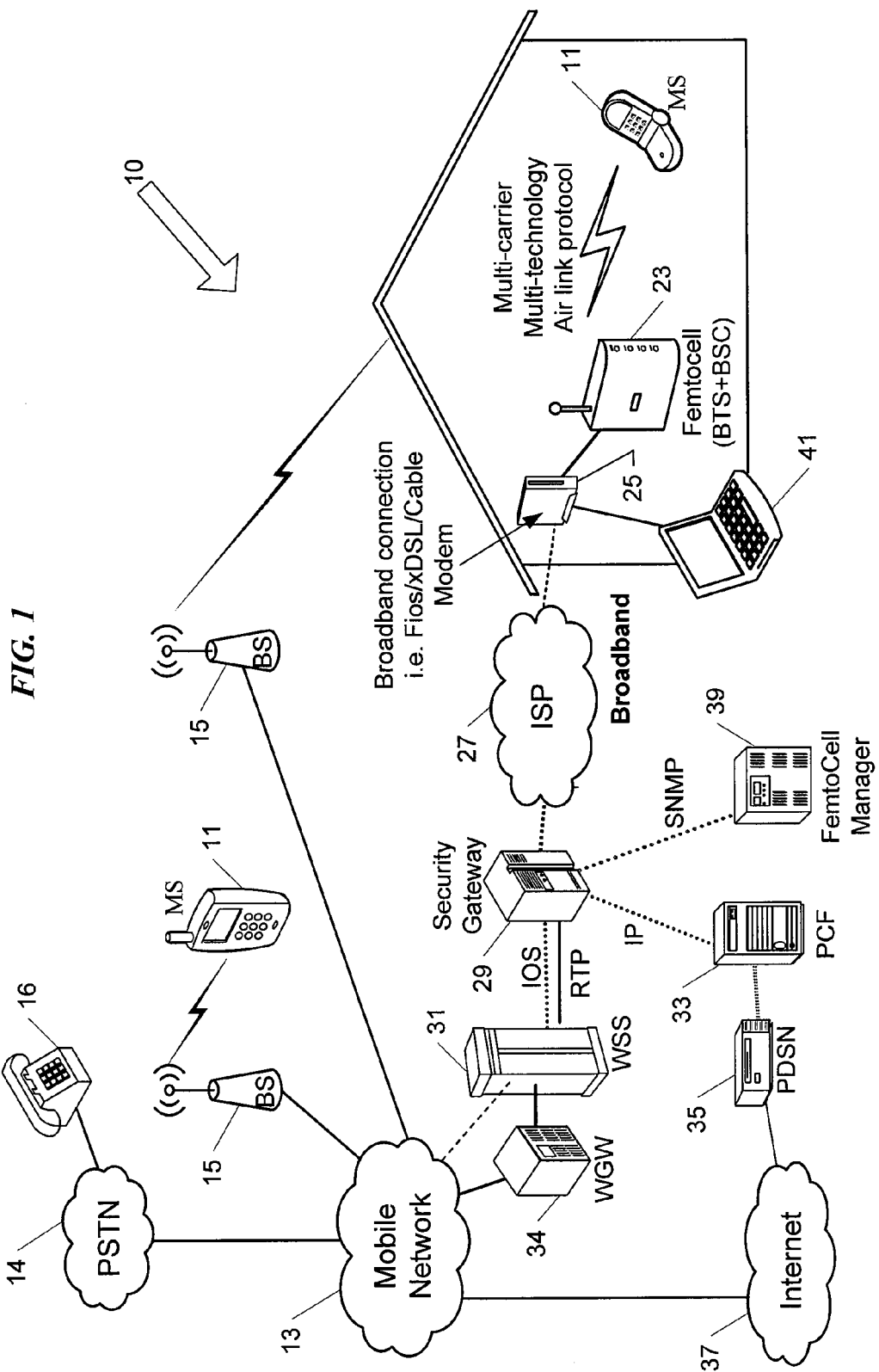
FIG. 1 is a simplified functional block diagram of an example of a system for providing wireless communication services, using macro public mobile network equipment as well as femtocell equipment at an exemplary customer premises location.

To appreciate such femtocell operations, it may be helpful first to discuss a system/network arrangement in which a mobile station operable via a macro mobile network may access a femtocell. FIG. 1 is a functional block diagram of a system 10 for providing wireless communication services for mobile stations (MSs) 11, using both macro cell public network equipment and femtocell equipment at customer premises locations. In the example, a mobile service provider operates the macro scale public mobile communications network 13 and provides mobile stations 11 to its customers, i.e. so that the mobile station users obtain wireless communication services through the macro mobile network 13. The service provider also supplies femtocell equipment to some of its customers, for customer premises deployments; and the service provider may also operate some additional equipment (such as a soft switch) to support femtocell communications. Hence, in the example, the system associated with or operated by the mobile service provider includes the macro mobile communications network 13, the customers' mobile stations 11, the femtocells and any of the service provider's equipment that supports the femtocell communications. The service provider's system may utilize or communicate through other networks or systems not owned, operated or affiliated with the service provider or its system(s) or network(s), such as the public switched telephone network (PSTN) or the public Internet 37.

In many areas today, one or more wireless service providers or carriers operate a mobile network 13, to provide wireless mobile communications services over a radio airlink for mobile stations 11. Typically, such a macro mobile communications network uses a 'cellular' architecture. A mobile service provider offering service throughout the country will operate similar networks in various geographic regions. In some countries, particularly in the USA, a number of service providers operate two or more such networks and compete for providing services to mobile customers. For convenience, the example shows one such mobile network 13, as a service provider might deploy equipment to serve a given geographic region or area.

For discussion purposes, the example shows a limited number of the elements of the service provider's mobile network 13. Hence, in the example, the mobile service provider operates a number of base stations or "BSs" 15. Although shown outside the 'cloud,' base stations 15 are logically part of the network 13. The mobile service provider also deploys other elements forming the network 13, such as a base station controller (BSC) and one or more mobile switching centers (MSCs) which are not separately shown. The base stations 15 and the other elements of the mobile communications network 13 provide mobile wireless communication services to mobile stations 11 operating within areas or regions served by the radio coverage of the individual base stations 15. Each base station 15 typically includes an antenna system represented as a tower in the drawing and an associated base transceiver system (BTS). The BTS communicates via the antennas of the base station and over the airlink with the mobile stations 11, when the mobile stations are within range.

For purposes of discussion, a couple of mobile stations 11 appear in the drawing, to represent examples of the mobile stations that may receive various services via the mobile network 13 and other elements encompassed by or in communication with the system 10. Today, mobile stations 11 typically take the form portable handsets, smart-phones or personal digital assistants, although they may be implemented in other form factors. The network 13 allows users of the mobile stations to initiate and receive telephone calls as well as to participate in an array of different types of data communication services.

The mobile network 13 typically is implemented by a number of interconnected networks. Hence, the 10 network 13 may include a number of radio access networks (RANs), as well as regional ground networks interconnecting a number of RANs and a wide area network (WAN) interconnecting the regional ground networks to core network elements, such as the MMSCs. A regional portion of the network 13, such as that serving mobile stations 11, will typically include one or more RANs and a regional circuit and/or packet switched network and associated signaling network facilities.

Physical elements of a RAN operated by one of the mobile service providers, include a number of base stations represented in the example by the base stations (BSs) 15. Although not separately shown, such a base station 15 typically comprises a base transceiver system (BTS) which communicates via an antenna system at the site of base station and over the airlink with one or more of the mobile stations 11, when the mobile stations are within range. Each base station 15 typically includes a BTS coupled to several antennas mounted on a radio tower within a coverage area often referred to as a "cell." The BTS is the part of the radio network that sends and receives RF signals to/from the mobile stations that the base station currently serves.

The mobile network 13, particularly the base stations (BSs) 15 and their associated base station transceivers may be configured to conform to any one or more of the current or future developed digital wireless communication standards. For example, the network 13 could be an EVDO, TDMA or GSM network designed for cellular or PCS operation. One or more of the base stations may comprise a WiFi transceiver for hotspot operation. In the present example, we will assume that mobile network 13 is a CDMA type network for IS-95 and/or 1xEVDO operation, to provide both voice communications as well as a variety of data communications to users of compatible mobile stations 11.

The radio access networks also include or interconnect to/though a traffic network represented generally by the area within the cloud of the network 13, which carries the user communications for the mobile stations 11 between the base stations and other elements with or through which the mobile stations communicate. Individual elements such as switches and/or routers forming the traffic network are omitted here for simplicity.

The traffic network portion of the mobile network 13 connects to a public switched telephone network (PSTN) 14. This allows the network 13 to provide voice grade call connections between mobile stations 11 and regular telephones connected to the PSTN, represented generally by the exemplary telephone station 16, although the PSTN may provide communications with a variety of other types of devices. The traffic portion of the mobile network 13 also connects to a public packet switched data communication network, such as the network commonly referred to as the "Internet" shown at 37, for communications with other data devices. Packet switched communications via the network 13 and the Internet 37 may support a variety of user services through the network 13, such as mobile station communications of text and multimedia messages, e-mail, web surfing or browsing, programming and media downloading, etc. For example, the mobile stations 11 may be able to receive messages from and send messages to user terminal devices, such as personal computers, either directly (peer-to-peer) or via various servers (not separately shown).

In the example, the mobile service provider's macro network 13 offers voice telephone service for and between mobile stations 11. Although not shown, those skilled in the art will recognize that such telephone service also includes voice calls between mobile stations and landline telephones through the PSTN. Most modern networks also offer a variety of text and data services, although for ease of discussion, the example here focuses mainly on voice services.

The carrier operating the network 13 will also offer in-home or customer premises services via femtocell equipment. The carrier may lease or sell the femtocell equipment to any number of its customers in the area served by the macro network 13. However, for discussion, the illustration shows one home or other premises having a femtocell 23. To a mobile station 11, within range, the femtocell 23 generally appears like a base station of the public macro cellular mobile network 11. However, the femtocell provides an IP connection to a broadband modem 25. The modem 25, in turn, provides broadband connectivity to a network 27 offering packet data connectivity from an Internet Service Provider (ISP). Although shown separately, for convenience, the ISP network 27 typically offers communications to sites/systems accessible via the public Internet 37, e.g. for communications of customer premises data equipment such as the exemplary personal computer (PC) 41. Of course, the ISP network 27 may also offer connectivity to private networks (not shown). For purposes of femtocell communications, for customers of the mobile network service provider, the ISP/Internet network communications capability also provides two-way transport for packetized voice and associated signaling for mobile station calls via the femtocell 23. To that end, the network 27 enables communications with a gateway 29, which the service provider utilizes to maintain security of its mobile network facilities.

The security gateway 29 performs a routing function and provides the interface between the public IP packet network (the ISP network 27 in our example) and the IP network elements that the service provider has deployed in support of communications via the femtocells 23. For example, the gateway 29 provides routing of femtocell packets to/from the wireless soft switch (WSS) 31. The gateway also implements the security to protect to IP network elements that the service provider from other communications on the ISP network 27 and/or the public Internet 27. Security functions may include functions of a firewall, for example.

To manage wireless calls via the femtocells 23, the mobile network service provider will also operates a server or other platform 31 providing a soft switch functionality. From the perspective of the mobile network 13, the wireless soft switch (WSS) 31 will appear much like mobile switching center of the mobile network 13. The wireless soft switch 31 communicates with the elements of the mobile using protocols compatible with the particular implementation of the network 13. The wireless soft switch 31 communicates with the femtocells 23 via IP packet transport through the ISP network 27 and/or the public Internet. Hence, in addition to its call/session control functions, the WSS 31 also performs the requisite protocol conversions between those used for signaling and bearer communications via the mobile network 13 and the various packet based protocols used for the communications between the WSS 31 and the femtocells 23. The WSS 31 may be implemented on a special purpose platform, but typically is implemented in software running on a server or other host computer type general purpose hardware platform.

In the example, the mobile network service provider also deploys a wireless gateway (WGW) 34. The gateway 34 acts as a router between the IP domain elements serving traffic to/from the femtocells 23 and provides the interface for such elements with the elements of the mobile network 13. For example, from the perspective of the mobile network 13, all signaling and bearer communications relating to femtocell traffic are routed through the wireless gateway (WGW) to and from the wireless soft switch (WSS) 31. The WGW router 31 also provides further security for the core elements of the mobile network 13.

For packet data communications, the traffic network 13 supports two-way packet communication of mobile station traffic. Although not separately shown, the networks such as 13 that offer packet data service will typically include an element either at the base stations or the mobile switching centers for implementing a packet control function (PCF). The PCF function converts the radio protocols into packet protocols to allow the associated PDSN to route packets in standard packet protocols. Through the PCF, two-way packet communication for the mobile stations extends between the base stations 15 and a Packet Data Serving Node or PDSN (not separately shown in network 13). The PDSN establishes, maintains and terminates logical links to the associated portion of the radio access network. The PDSN also supports point-to-point protocol (PPP) user data sessions with the mobile stations. The PDSN provides the packet routing function from the radio network formed by bases stations 15 and 111 to/from other packet switched networks, such as the Internet 37.

To support similar capabilities for mobile communications via femtocells 23, the service provider may provide a PCF 35 and a PDSN 35 coupled to the Internet 37. The PDSN 35 may be a PDSN of the macro scale network 13 or a similar device dedicated to femtocell operations. Of note for purposes of this discussion, the PCF provides IP packet communications connectivity for the PDSN 35 with via the security gateway 29 and ISP network 27 with the femtocell type base stations 23.

In the example, the mobile network service provider also deploys a femtocell manager 39. The manager 39 utilizes simplified network management protocol (SNMP) over IP type packet data transport to communicate with devices that it manages, in this case with the femtocells 23. For protection of the manager device, the femtocell manager 39 communicates with the femtocells through the security gateway 29. The femtocell manager 39 typically is implemented in software running on a server or other host computer platform. The femtocell manager 39 is a centralized is a processing node on which a number of femtocells 23 are 'resident' for management purposes. The manager 39, for example, accounts for the femtocells and may monitor the operational status of the femtocells. The manager 39 may have an interface to the femtocells 23 to adjust aspects of the femtocell operations, such as channels on which the femtocells transmit. In that regard, the functions of the femtocell manager 39 may be similar to those of a BSC in controlling a number of base stations 15 of the mobile network 11.

Figure 2:
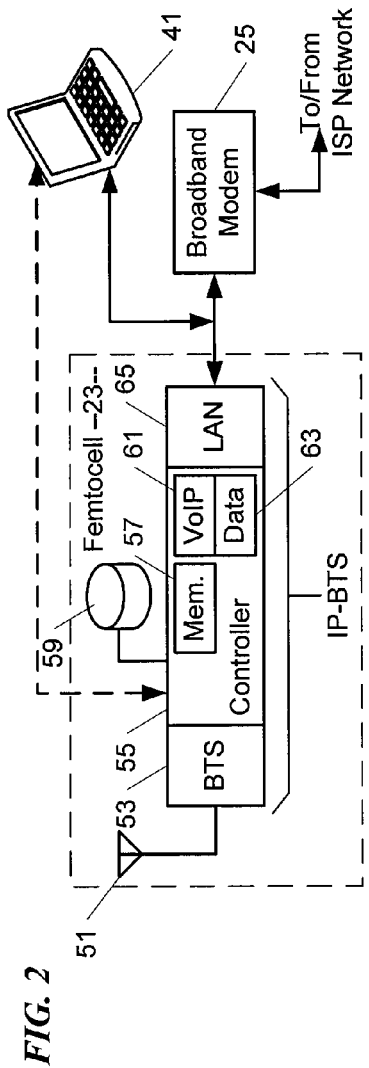
FIG. 2 is a functional block diagram of a femtocell and associated equipment at the customer premises location in the system of FIG. 1.

As shown by way of example in FIG. 2, a femtocell 23 typically comprises an IP-BTS. Such a device includes a base transceiver system (BTS) 53 and associated antenna 51, for radio communications. The femtocell also includes an associated controller 55, typically in the form of a processor which performs a local function analogous to that of a base station controller (BSC), with respect to radio communications via the BTS 53 and antenna 51. The controller 57 includes or connects to one or more memories 57, for storing control programming and associated data. The controller 57 also includes or connects to one or more memories or storage devices storing a database 59 of provisioning information, utilized in the algorithm to determine the hopping sequence for frequencies that the femtocell 23 utilizes for its pilot beacon transmissions. Although shown separately for discussion purposes, the database 59 may be stored in the memory 57 that contains the necessary programming and other data normally utilized by the controller 55.

The femtocell BTS transceiver and associated BSC functionality are generally similar to those used in a public network, although the femtocell versions are scaled down for customer premises use. Over the airlink, the BTS will appear substantially similar to a public or macro network BTS, except for the power level and possibly the particular one of the licensed frequency bands on which the macro and femto BTSs operate. Beacon transmissions on various operational frequencies are discussed in more detail, later.

Since the mobile stations and the interfaces/protocols used over the airlink are the same as used in the macro network, the communications may not be compatible with direct IP transport. Hence, the exemplary IP-BTS also includes one or more interworking or protocol conversion functions for voice and/or data, shown generally as functions 61 and 63 of the controller 55. For voice, for example, the VoIP functionality 61 of the femtocell 23 will provide two-way conversions between a Voice over IP (VoIP) packet format and the voice data format used by the mobile stations 11 and the various BTSs.

The femtocell 23 further includes a packet communication interface. Although other arrangements or interface types are possible, the example uses a local area network (LAN) interface 65, which in this example serves as the data interface for providing packet communication for the mobile station(s) using the femtocell 23, via the customer's broadband modem 25. The modem 25, for example, may be a digital subscriber line (DSL), cable modem, optical fiber modem, or the like. The present concepts also encompass arrangements that utilize broadband wireless transport for IP packet services. Through the modem 25, the LAN interface 65 provides two-way IP packet communication (e.g. for VoIP) with a wide area packet data communication network, for the mobile communications through the IP-BTS of femtocell 23. In the example of FIGS. 1 and 2, the wide area network is an ISP network 27.

In general, each femtocell BTS is capable of operating on a selected one or more of a number of frequency channels. The BSC functionality of the controller 55 configures the femtocell BTS 53 to provide at least a pilot on one of the channels of the provider's macro network 13 in the region that encompasses or is adjacent to the location of the femtocell 23. In actual practice, the femtocell is capable of pilot beacon signal broadcast on all or substantially all of the carrier frequencies used for at least pilot channels by base stations of a region of the public macro mobile communication network including the customer premises. As described herein, however, the transmissions are limited in a manner to optimize acquisition, that is to say by limiting some or all of the transmissions to the carrier frequency or frequencies corresponding to the mobile station(s) expected to utilize the particular femtocell 23.

In a network such as the public macro mobile network 13, one method employed to direct mobile stations 11 onto the traffic bearing carriers of base stations 15 on frequencies differing from home switch frequencies is to employ a "beacon" signal to serve as a trigger to the mobile station. In the realm of femtocell deployment, each femtocell 23 is expected to operate in a frequency differing from the surrounding legacy macro-network cell coverage. One strategy to direct approaching mobile stations 11 to use the femtocell 23 is to require the femtocell 23 to generate beacon signals. As outlined above, however, depending upon the spectrum owned by a network provider, the number of macro-network carriers present in the macro network 13 can be quite large, therefore it is expected the number of beacons a femtocell 23 would be expected to generate would match the macro-network carrier list, and as such be equally large. The requirement to generate, transmit and cyclically regenerate pilot beacon signals on a large number of carriers, induces a system acquisition time lag component into the ability of an approaching mobile station 11 to "find" the femtocell 23 and "lock on" to it for service. During the time between leaving the macro-network service and "finding" the femtocell 23, the mobile station 11 would indicate "no-service".

Mobile stations in multi-carrier macro-network environments are managed onto single carriers within that environment by means of a hashing algorithm. This algorithm is dependent upon the MIN or another standard identifier of the device and given that it does not change, the result of the algorithm does not change and therefore the mobile station is expected to utilize the carrier number resulting from the hashing algorithm. Hence, during mobile registration, the macro-network 11 captures the MIN or the like of the mobile station 11, uses the count of the deployed carriers and calculates the result of the hashing algorithm, thereby generating and storing an expectation of the specific carrier within the multi-carrier environment upon which the mobile station 11 can be paged and upon which the mobile station 11 would be expected to originate calls.

With deployment of femtocells 23 in residences, and small customer count environments (small office/home office) it is anticipated that a small regular set of mobile stations 11 will repeatedly approach and require access to any particular femtocell 23. As described herein, we propose that the femtocell 23 should be provisioned with stored hash-algorithm results for the mobile station or stations associated with or expected to utilize the particular femtocell 23. In the examples, the femtocell is provisioned with an appropriate mobile station identifier for each mobile station 11 expected to utilize the particular femtocell 23, and the femtocell applies the hashing algorithm to identify the specific carrier within the multi-carrier environment upon which the mobile station 11 typically can be paged and upon which the mobile station 11 would be expected to originate calls in the macro mobile network 13. Alternatively, the femtocell could be provisioned with the appropriate carrier identifications. Once the appropriate carrier or carriers are determined, the femtocell could then generate and transmit beacons for only the specific carrier or carriers the hash-algorithm result dictates that the mobile station or stations associated with that femtocell typically use. This dramatically reduces beacon generation, transmission and retransmission load. Conversely, such an optimized beacon hopping would result in faster generation, faster transmission, faster re-transmission of the beacon signal and dramatically reduce the period of time required for the mobile station 11 to "find" the femtocell 23 and return to service.

In the cases of multiple mobile stations regularly accessing a femtocell, the beacon list may be adjusted to provide beacon signals for each of those mobile stations as applicable. In cases where an unexpected large number of mobile stations require access to a femtocell location, the beacon list generation, transmission and re-transmission may periodically accommodate the entire compliment of macro-network carrier signals.

In the cases of macro-networks consisting of multiple frequencies, serving multiple technology services, the femtocell may be capable of receiving multiple hashing algorithm result solutions for multiple devices on separate frequency bands, and to use these solutions to generate, transmit and retransmit suitable beacon signals associated with all applicable mobile stations expected to use the femtocell.

The carrier hashing resultant information could be generated, captured and delivered to the femtocell, e.g. via the femtocell manager 39 system. This system is expected to deliver capabilities to manage which mobile stations are permitted access to individual femtocells via a network operator or customer accessible femtocell authorization provisioning function. This function is expected to require submission of mobile station MIN identification information. With this information readily, locally available, the femtocell manager 39 could deliver the hashing algorithm carrier result directly to the femtocell 23.

Alternatively, the carrier hashing information and resultant beacon management could be generated by the femtocell 23 itself, for example, by local user provisioning of the mobile station identifiers or by collecting mobile station registration information over-the-air, e.g. during an initial start up period. In such cases, the controller of the femtocell 23 locally calculates the carrier hashing solution and uses that information to locally manage the number(s) of carrier beacons required to efficiently generate beacons and more rapidly direct mobiles 11 onto the femtocell 23.

Figure 3:
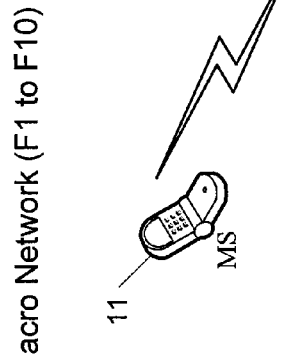
FIG. 3 is a diagram that may be helpful in understanding the idle state mobile acquisition of a femtocell and the femtocell redirection of the mobile station to another carrier.

FIG. 3 provides a simple illustration useful in explaining use of a pilot beacon to allow idle state acquisition of a femtocell 23 by a mobile station 11. In the example of FIG. 3, the mobile station 11 idles on carrier F2. For example, the mobile station 11 runs an algorithm to select the carrier F2 from among the service provider's frequencies, based upon hashing of one of its own identifiers, possibly its ESN but more likely the mobile identification number (MIN) that the carrier has assigned to the mobile station. Numerous mobile stations seeking access through femtocells therefore may be looking for a relatively large number of different preferred pilot channel frequencies.

The femtocell 23 is programmed with the relevant mobile station data, for simplicity, assuming only the one mobile station 23 is expected to normally obtain service through the particular femtocell. Hence, the femtocell 23 broadcasts the pilot beacon, predominantly on F2. As the mobile station 11 comes under the femtocell coverage (or is turned ON under the femtocell coverage), the mobile station 11 finds femtocell pilot beacon on carrier frequency F2. The pilot beacon carrier frequency F2 includes signaling from the femtocell 23 to redirect the mobile station 11 to another carrier licensed channel that is clear for femtocell use, in this example, to the carrier frequency F11. Thereafter, the mobile station 11 operates on F11 of femtocell 23 for so long as it remains under the coverage of the particular femtocell 23.

In the example of FIG. 3, the femtocell 23 broadcasts the pilot beacon signal on the channel F2, to enable the particular mobile station 11 to find the femtocell and initiate a standard procedure to access network communications via the femtocell in a manner that is similar to accessing a base station of the macro mobile network 11. In accord with the present teachings pilot beacon operations of the femtocell are prioritized based on prior knowledge of the mobile station identity. Examples will be considered in which the femtocell broadcasts the pilot beacon on only one of the pilot channel carrier frequencies of the macro mobile network 13 surrounding the particular premises. Other examples transmit femtocell pilot beacon signals on some limited number (some but not all) of the pilot channel carrier frequencies of the macro mobile network 13 surrounding the particular premises, based on provisioned information identifying some number of mobile stations expected to utilize the particular femtocell and thus mapping to the limited number of the carrier frequencies used for the pilot beacon signal transmissions.

Typically, such prioritized pilot beacon transmissions occur for at least a substantial portion of the time of operations of the femtocell. However, such operations may be interrupted somewhat infrequently or intermittently for a short period of time, for example, to allow the femtocell to hop through all of the pilot beacon on only one of the pilot channel carrier frequencies of the macro mobile network 13 surrounding the particular premises, for example, to allow stations for which the femtocell is not yet provisioned to lock-onto and access service through the femtocell. In some examples, such new access may also serve to add the newly identified station to the list of stations for which the femtocell is provisioned, at least for some period of time.

The examples discussed below also encompass a number of different approaches to provisioning the mobile station information into the controller 55 and associated database 59 of the femtocell. For example, the customer may program the femtocell with identifiers of the customer's mobile stations. Alternatively, management or provisioning elements of the network operator or service provider may provision the femtocell with the appropriate mobile station identifiers. In an automatic approach, the femtocell may automatically learn mobile station identifiers from allowing new mobile stations to access service through the femtocell and obtaining the identifiers from the mobile station communications, for user in later prioritized pilot beacon transmission.

Figure 4:
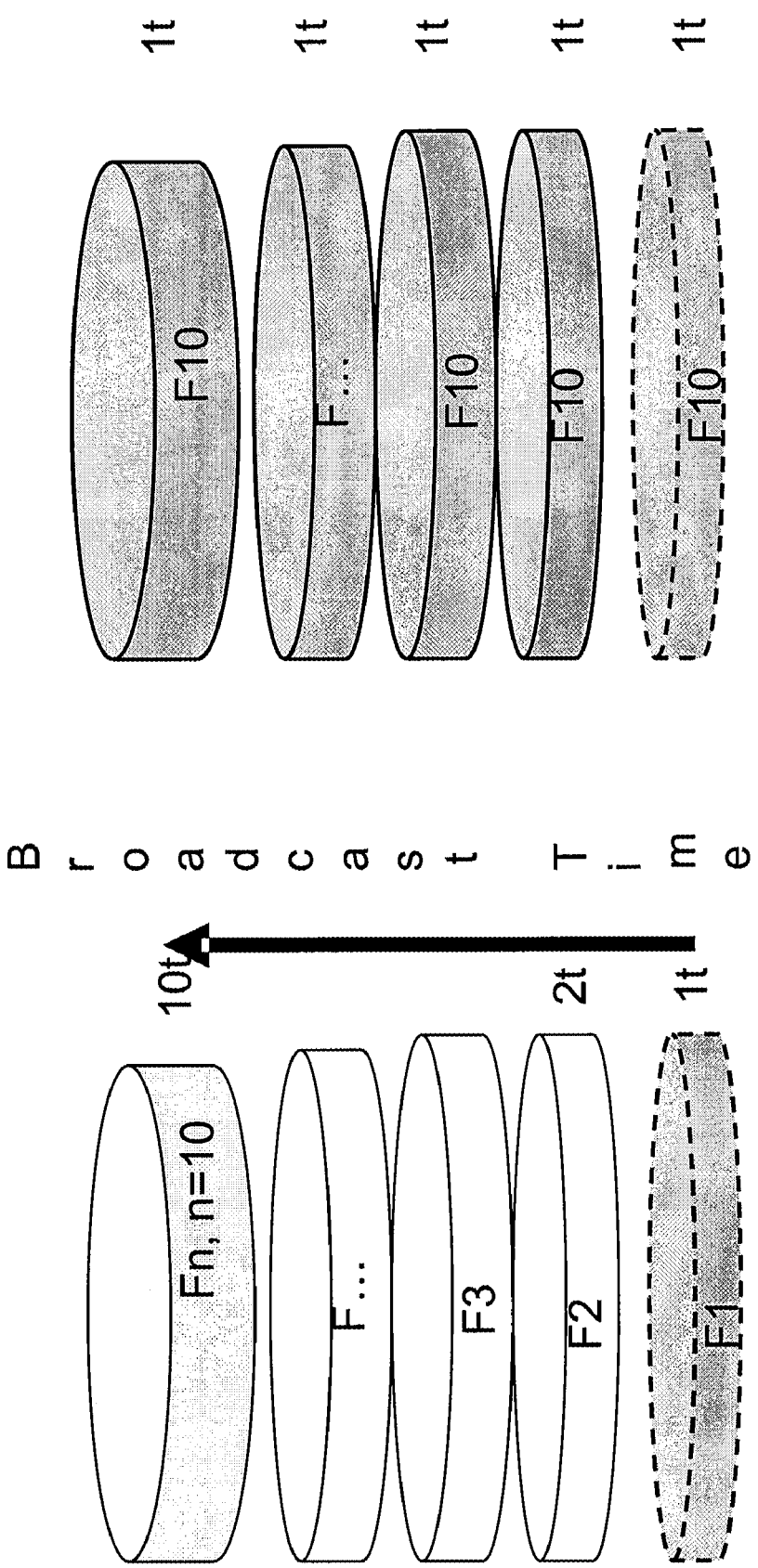
FIG. 4 depicts a comparison between sequencing or hopping among ten macro network carrier frequencies for pilot beacon transmissions and transmission of a pilot beacon on one of the carrier frequencies selected in response to provisioning of the femtocell with an identification of a mobile station expected to acquire the particular femtocell.

To appreciate the advantages of the prioritized sequence for hopping of pilot beacon signal transmission, consider first the example of FIG. 4. That drawing shows the wireless or mobile service provider deployed spectrum carriers F1-Fn (use example of number of frequencies n=10). As shown on the left side of the drawing, a femtocell beacon functionality would transmit pilot beacon signals sequentially on frequencies F1-F10, that is to say by hopping to each frequency, transmitting on that frequency for some interval, hopping to the next frequency and transmitting for some interval, and so, on to cycle through all of the frequencies on some periodic basis. In a worst case example, a single Customer Device looks to utilize F10 based upon its MIN/ESN hashing algorithm to find a pilot signal for idle state acquisition. In the ten frequency example, where the time to broadcast a pilot signal on each frequency is t seconds, the time to cycle through once from F1 to F10 requires approximately 10t seconds. If the F10 pilot signal transmission has just ended when the mobile station first looks for a pilot, e.g. the mobile station comes within range or is turned on just after the F10 transmission, the mobile station may need to wait almost that long before it can detect a pilot signal. If for some reason it does not hear the pilot signal on the first transmission, e.g. due to some interference, the station may need to wait through one or more additional 10t second cycles.

The femtocell 23, for example, may transmit cyclically on all of the frequencies at times, for example, before provisioned for one or more expected mobile stations and/or on an intermittent/infrequent basis to allow other mobile stations to discover the femtocell.

However, once provisioned, the hopping sequence of the pilot beacon signal transmissions from the femtocell can be prioritized based on identification of one or more mobile stations expected to utilize the particular femtocell. In the example of FIG. 4, assume now that the femtocell is provisioned with an identifier of the mobile station 11, such as the International mobile station identifier (IMSI), the MIN and/or the ESN. Based on hashing of the mobile station identifier, the femtocell knows that the particular mobile station is configured to look for a pilot on a particular frequency, F10 in the example of FIG. 4. Since that station is the only station having its identifier provisioned into the particular femtocell, the femtocell can optimize its pilot beacon signal transmission for that one mobile station. Hence, for at least a substantial number of cycles (and possibly at all times) the femtocell will transmit its pilot beacon signals only on the one carrier frequency, F10 in the provisioned example represented by the diagram of the transmission cycle on the right side of the drawing. Stated another way, the femtocell identifies only the one mobile station as being expected to utilize the femtocell, therefore the femtocell limits its pilot beacon signal transmissions to only the one of carrier frequency determined to correspond to the identifier (based on hashing of the identifier) for the one identified mobile station. With such an implementation, a single customer device carrier would be broadcast repeatedly, as often as femtocell carrier beacon transmission design dictates, and would be available for detection to facilitate femtocell access substantially constantly.

FIG. 5 again shows the wireless or mobile service provider deployed spectrum carriers F1-Fn (use example of number of frequencies n=10). When not provisioned, the femtocell cycles through frequencies F1-F10 for its pilot beacon signal transmissions, similar to FIG. 4. Multiple mobile stations may utilize a particular femtocell. Assume for discussion purposes that the particular mobile stations utilize frequencies F2, F4 F8 and F10 based upon the MIN/ESN hashing algorithm, as represented by the shaded cylinders in the full 10 frequency cycle on the left side of the drawing. Time to broadcast to each device still requires approximately 10t seconds to perform in a 10 carrier repeating cycle. Approximately 60% of the complete cycle relates to transmissions on other carrier frequencies.

Now assume that the femtocell 23 is provisioned with the identifiers of the particular mobile stations expected to utilize that femtocells. Based on the same MIN/ESN hashing algorithm, the femtocell identifies frequencies F2, F4 F8 and F10 as the pilot channels that the expected mobile stations look for. Hence, the femtocell limits its pilot beacon signal transmissions to only the identified carrier frequencies corresponding to the identified mobile stations, that is to say to the frequencies F2, F4 F8 and F10 in the example shown to the right side in FIG. 5. The femtocell therefore repeatedly cycles through or hops among the four identified carrier frequencies in sequence to transmit pilot beacon signals on the identified carrier frequencies, without transmitting a pilot beacon signal on any other of the carrier frequencies (F1, F3, F5-F7, or F9). With such an implementation, the carriers utilized by the particular mobile stations would be broadcast in 4t seconds and repeated, resulting in faster access of customer devices to femtocell.

As outlined earlier, there are a number of ways to program or provision the identifiers of the one or more mobile stations 11 expected to use the particular femtocell 23 into the database/memory of that femtocell. One type approach for example entails manual input of the mobile station identifier data. This type of provisioning could utilize a user interface, if one is provided on the femtocell itself. However, in most implementations, the femtocell does not include elements for an on-board user interface, therefore the provisioning of the femtocell for this and other purposes relies on a user terminal device in communication with the femtocell, for example, via a data port or via the customer premises network and the LAN interface 65.

Hence, in the example of FIGS. 1 and 2, the customer has a personal computer or the like for various data communication applications, as represented generically by the laptop PC 41 in the examples. Such a device connects via the customer premises network or LAN to the broadband modem 25, for Internet services or the like. The LAN, however, also enables communications between the PC 41 and the femtocell controller 55 via the interface 65. Instructions that accompany the femtocell at time of purchase or as may be provided from an Internet website enable the user to operate the PC via its web browser or similar program to access the controller 55 within the femtocell 23. For example, the controller may be programmed to provide a simple web page type interface, with user identification and password security to allow access from a PC 41 or the like via the local area network (LAN) link.

Via the PC 41 and the interface programming on the controller 55, the femtocell offers the user a number of options to configure the IP-BTS operations of the femtocell 23. For example, the user may be able to modify the user identifier and password settings for control purposes and will typically be able to select between a private mode operation (only designated stations can access service through the femtocell) and a public mode of operations (any mobile station of a customer that subscribes to the provider's mobile services can access service through the femtocell). Of note for purposes of the present discussion of prioritized pilot beacon signal transmissions, the PC 41 and the interface programming on the controller 55 offer the user a mechanism or means to input station identification information for mobile stations that the user expects (wants the femtocell to expect) to utilize the particular femtocell. The controller then hashes the mobile station identifications to identify the pilot channel carrier frequency that each of those mobile stations normally looks for when attempting an idle station transition to a new mobile station (while roaming or upon power up).

Figure 5:
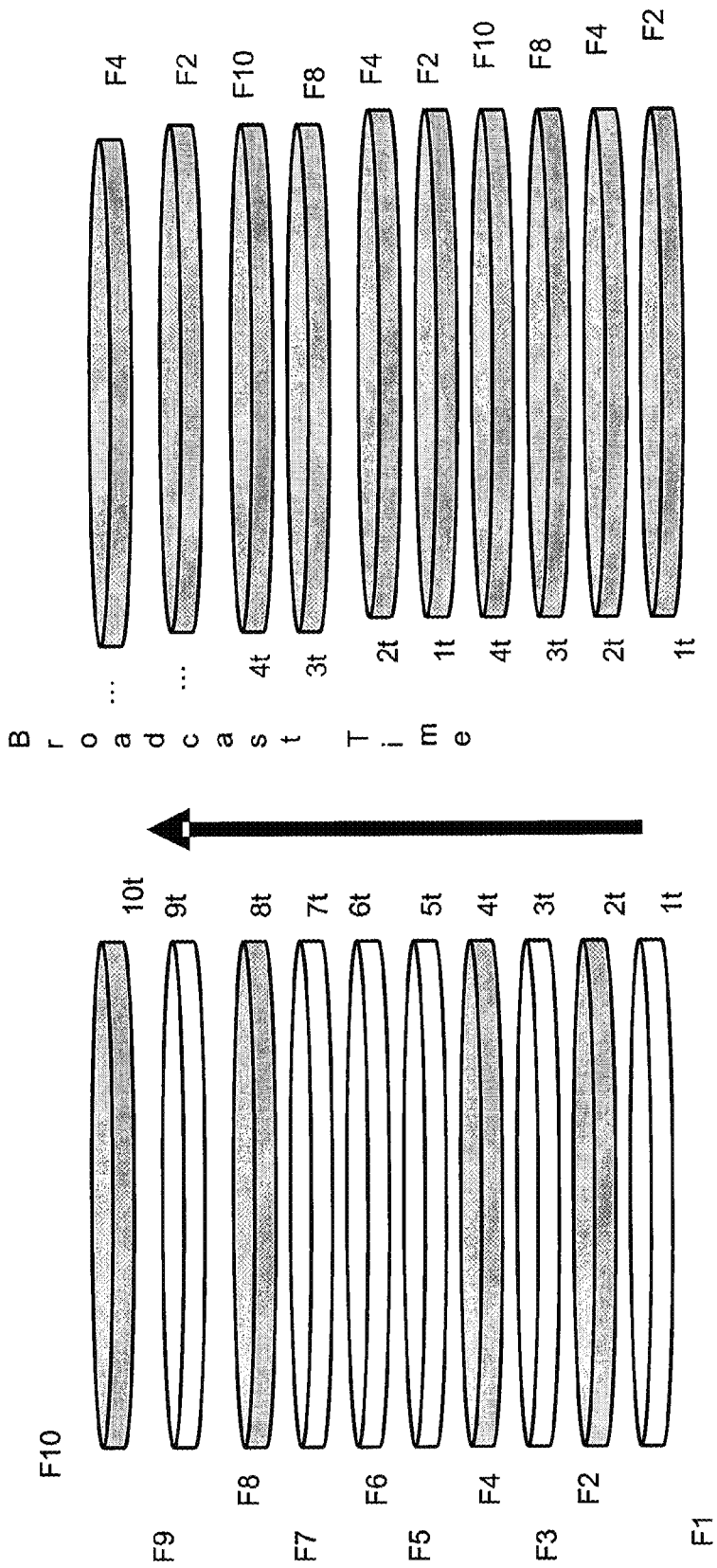
FIG. 5 depicts a comparison between sequencing or hopping among ten macro network carrier frequencies for pilot beacon transmissions and transmission of pilot beacons on four signal carrier frequencies selected in response to provisioning of the femtocell with identifications of a number of mobile stations expected to acquire the particular femtocell.

Whether manually provisioned as outlined above, or provisioned by one of the alternative techniques discussed below, the controller uses the provisioned carrier identification information for the identified mobile station or stations to prioritize its pilot beacon signal transmissions, to facilitate access to the femtocell by the identified mobile stations, for example, in one of the ways represented by the examples of FIGS. 4 and 5. Other mobile stations having identifiers that hash to the one of the carrier frequencies in the prioritized hopping sequence will also be able to gain faster more efficient access, unless the femtocell is set to operate in the private mode.

If set to operate in a public mode, the femtocell can provide access to any number of mobile stations 11 as they come within range. To facilitate this type of access, the mobile station may hop through all of the carrier frequencies of the macro mobile network 13 surrounding the particular premises (e.g. such as shown in the left side in FIG. 4). If already provisioned and transmitting pilot beacon signals based on mobile station identifications, the controller 55 may interrupt the prioritized transmission from time to time for a cycle in which the femtocell hops through and transmits a pilot beacon signal on each of the carrier frequencies of the macro mobile network 13 surrounding the particular premises. Alternatively, the femtocell may hop through all of these carrier frequencies at initial power-up, before provisioning with mobile station identifications. There may also be situations in which a mobile station enters or is turned on under the coverage of the femtocell but does not detect its preferred pilot channel and instead searches for and finds a pilot beacon on another channel, in this case a pilot transmission of the femtocell. Under any of these circumstances, if a mobile station detects the femtocell pilot beacon and attempts to access service through the femtocell, the requisite signaling provides the femtocell with the identification of the mobile station. In this way, the femtocell controller can automatically learn identifications of mobile stations that use the femtocell and store them for at least some period of time with the expectation that each such station may utilize that femtocell again in the near future.

Figure 6:
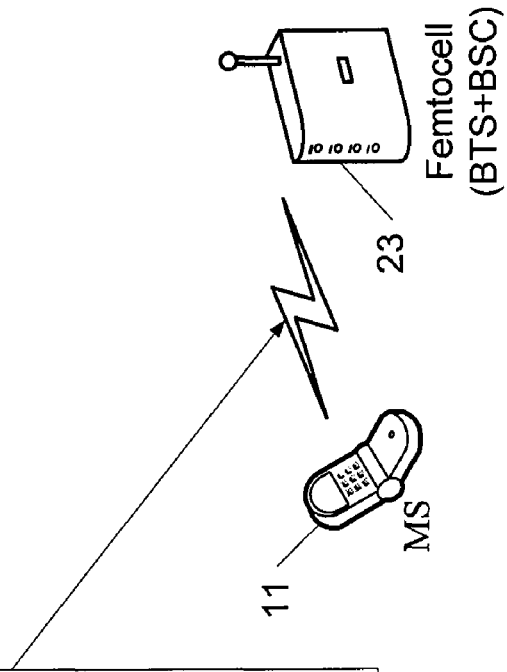
FIG. 6 is useful in explaining the contents of a mobile station registration message, which may be captured by a femtocell to learn the mobile station identification, for use in determining the carrier for which the mobile station searches when attempting to capture a pilot beacon signal for base station acquisition.

FIG. 6, for example, shows the data contained in a typical idle state registration message sent from a mobile station 11 to a base station in a CDMA type mobile network. The mobile station 11 will send this message to the femtocell 23, when it detects the femtocell pilot beacon signal and attempts to register through the femtocell, essentially in the same manner as it would if attempting registration through a macro network base station 15. As shown in the drawing, the registration message includes a variety of different pieces of information. Of note for purposes of this discussion, the message information includes the electronic serial number (ESN) and the International mobile station identifier (IMSI) of the registering mobile station 11.

The ESN is a number that the manufacturer permanently installs in the mobile station, to uniquely identify the particular hardware device. The IMSI is a twelve digit telephone number assigned to the particular mobile station by the mobile service provider. Essentially, the IMSI is the same as or similar to a MIN, which the network 13 uses to signal the mobile station over the airlink. Ten digits of the IMSI may correspond to the actual telephone number or MDN assigned to the mobile station, although increasingly, the IMSI or MIN is different from the MDN. In this case, the ESN and the IMSI are two different forms of identifiers for the one mobile station, and at least one of those identifiers is used to prioritize pilot beacon transmissions of the femtocell.

Hence, the controller 55 can compare one or both identifiers from the registration message to any identifiers already stored in the database 59. If such an identifier is not already contained in the database, then the mobile station 11 is registering for the first time (at least the first time within some database refresh interval). The controller 55 of the femtocell 23 therefore stores at least one of the identifiers for the newly registering mobile station 11 in the database 59, for its use in prioritizing future pilot beacon signal transmissions from the particular femtocell.

Figure 7:
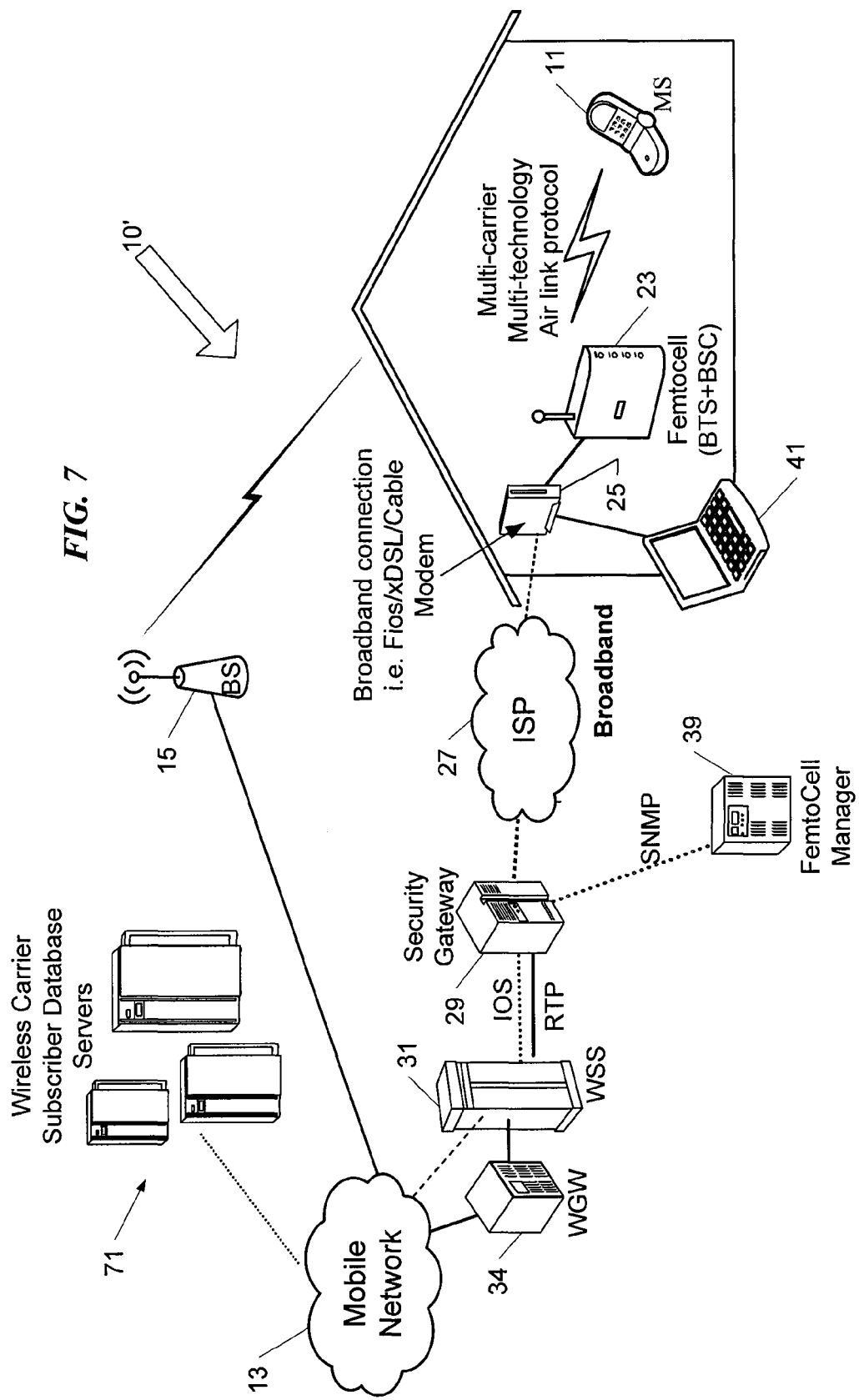
FIG. 7 is a functional block diagram of a system similar to that of FIG. 1, but focusing on somewhat different system elements as may be involved in alternative techniques for provisioning mobile device information into the femtocell to optimize the pilot beacon generation sequence.

The examples discussed so far have included techniques enabling a customer or other user to manually provision the mobile station identifiers into the femtocell or to enable the femtocell to automatically learn such identifiers for its provisioning from signaling messages received from mobile stations that attempt to access service through the femtocell. Those skilled in the art will recognize that a variety of other techniques may be utilized to program, store or otherwise provision the mobile station identification data into the femtocell. One general class of such other techniques rely on one or more data systems operated by the service provider, to supply the mobile station identifiers to the femtocell. To appreciate this later exemplary approach to provisioning the femtocell, it may be helpful to discuss the system as shown in somewhat alternate detail in FIG. 7. Many of the elements of the system of FIG. 7 are similar to those of FIG. 1 and are similarly numbered, although some elements have been omitted from FIG. 7 for convenience. However, as additionally shown in FIG. 7, the service provider or 'wireless carrier' also operates one or more subscriber database server, shown collectively at 71 in the drawing.

The database servers 71 store databases of information about the service provider's customers and their various mobile stations as well as other information related to the customers, which is useful to network operations and/or business operations of the provider, such as billing information. For example, when a customer subscribes to service through the network, the servers 71 will maintain the customer's records, including identification of each mobile station under the customer's account. When the customer in turn purchases a femtocell 23, that also is indicated in the customer's records in the database servers 71. Once the femtocell is connected through the modem 25, etc. to the network 13, it then becomes possible for the database servers 71 to communicate with and provision/control the femtocell 23. For example, if requested by the customer, one of the database servers 71 might transmit the mobile station identifier and/or the carrier frequency information (hash results), for one or more or all of the mobile stations under the customer's account, thus provisioning the femtocell 23 with the information to optimize the prioritized hopping sequence for pilot beacon signal transmissions.

As shown by the above discussion, at least some functions relating to the optimum generation of pilot beacon signals, cycling through transmission of the resulting pilot signals as well as learning and/or provisioning the requisite mobile station information into the femtocell may be implemented on the processor of the femtocell in response to appropriate programming and provisioning thereof with the identifiers of the mobile station or stations that may be expected to utilize the femtocell. Hardware of an exemplary femtocell has been discussed above relative to FIG. 2. Aspects of the present technology therefore encompass appropriately configured or programmed femtocells as well as the methods of operation of such femtocell.

However, the present technology also encompasses programming for implementing the disclosed techniques for optimized frequency selection or hopping, for pilot beacon signal transmissions from a femtocell. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the femtocell programming. All or portions of the software or firmware type programming may at times be communicated through the Internet or various other telecommunication networks. Such communications, for example, may enable loading of the programming from one computer or processor into another, for example, from a management server or host computer of the network operator or service provider into the program memory of the femtocell. Thus, another type of media that may bear the program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the femtocell and/or terminal devices or network devices used to provision the femtocell shown in the drawings. Volatile storage media include dynamic memory, such as main memory of such a computer platform or within a femtocell. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM, EPROM or EEPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

There are a wide variety of situations in which the optimized pilot beacon hopping may be useful in femtocell deployments. For example, with at least one present day deployment of a femtocell product, "Upon idle mode handoff from macro network to the femtocell, with FREQ_INCL set to "0", the current "femtocell" assigned (PN=0) neighbor configuration of 2 setting causes mobile stations to go to the primary channel to decode the paging channel instead of to the femtocell operating channel. Since the standard femtocell transmits a hopping pilot beacon sequentially on all macro channels for 3.4 seconds at a time, chances are slim that the mobile stations will correctly decode the paging channel from the femtocell. Hence, the mobile stations will remain on the macro network instead and will not perform idle handoff into femtocell. Changing the neighbor configuration to 1 ensures the mobile station will decode the paging channel on femtocell operating channel. Hence the mobile stations will be reliably redirected to the femtocell operating channel on either band class. However, optimizing the beacon sequence hopping as discussed herein along with associated wireless standard switch translation settings will further improve the ability for customer mobile station devices to acquire service via the femtocell as rapidly as possible.

In the examples above for a single mobile device 11, the femtocell 23 should broadcast the single pilot beacon devised according to the described technologies and then, as described earlier, possibly broadcast the full compliment of carrier beacons for the network service area. A modification for this would be an added pilot beacon broadcast schedule where in the single device pilot beacon is broadcast and in a subsequent cycle a "primary carrier" beacon signal is broadcast. IS95 contains requirements that in a situation where a mobile station enters a "no service" situation, the mobile station itself is required to scan the "primary carrier channel" of the cellular frequency spectrum band belonging to the wireless carrier serving the device. Where Verizon Wireless is the service provider, for example, this would require the mobile station to scan channel 384 "F1" and perform pilot beacon redirection using that "F1" signal. Hence, a femtocell pilot beacon transmission on that F1 frequency would facilitate mobile station acquisition of the femtocell.

The pilot beacon hopping optimization concepts also encompass the capability to schedule customized pilot beacon repetition schemes on a "time-of-day"/"day-of-week" basis. In other words, in an example location with 4 wireless mobile devices, the scenario wherein device #1 is anticipated to use the femtocell 7 days a week, but devices 2, 3 and 4 may only use the femtocell on weekends, the femtocell pilot beacon generation mechanism and algorithm should encompass the capability to schedule beacon generation and broadcast according to an anticipated device schedule in addition to all other claims. This scheduling manipulation could be performed via any of the already envisioned methods of femtocell provisioning. Furthermore, the TOD/DOW scheduling capability should be "learn-able" by the femtocell, in as much as for instance device 2, 3 or 4 would be in proximity to the femtocell, and register with it via any of the prior envisioned methods, but do so on a day other than the "scheduled" TOD or DOW. The femtocell could be configured to capture that registration message, scan the MIN/ESN/IMSI against a database of mobile station devices provisioned to use the femtocell, and then once determining that the TOD/DOW in question is outside of the scheduled TOD/DOW, alter the carrier beacon broadcast scheme/schedule for some period of time while device 2, 3 or 4 are "seen" to be using the femtocell. Once device 2, 3 or 4 are not "seen" using the femtocell for some period time, the femtocell should revert to the most efficient pilot beacon generation/broadcast scheme/schedule to accommodate the devices still "seen" to be using the femtocell.

The femtocell pilot broadcast determination scheme also can be "intelligent" enough to recognize the difference between a wireless service provider licensed spectrum carrier count and the carrier count actually in use in the lat/long location of the femtocell. For instance a wireless service provider may have spectrum license ownership of 10 carriers, however, due to population density or network requirements, in a particular county or area of that wireless provider territory, the wireless carrier has only determined the network need to broadcast 5 carriers. The femtocell pilot beacon broadcasting algorithm must be "intelligent" enough to not only survey the lat/long of the location, but detect and decode the carrier messaging from some nearby cell site (at a RF energy level much too low to actually carry traffic, but detectable by the femtocell nonetheless). The femtocell could then use the detected carrier count information to feed the pilot beacon/device hash algorithm and further optimize the broadcast scheme. This scenario is envisioned as follows. The wireless service provider is licensed to broadcast 10 carriers. The customer device MIN hash solution in a 10 carrier environment results in a solution of F10. The femtocell would then generate and broadcast F10 repeatedly. However, in this example, the location of the femtocell is such that the wireless service provider is only using 5 carriers, in other words, F5. The femtocell broadcasting F10 repeatedly would fail to "find" and redirect the device in an efficient fashion. If however, the femtocell detected the carrier messaging from a relatively nearby cell and "learned" that this particular portion of the network only uses F5, then the femtocell would re-calculate the device hash solution based upon 5 carriers instead of 10. The modified pilot beacon generation would result in efficient generation of F5 repeatedly.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

BS—Base Station
BSC—Base Station Controller
BTS—Base Transceiver System
CD—Compact Disk
CDMA—Code Division Multiple Access
CD-ROM—CD Read Only Memory
DOW—Day of Week
DSL—Digital Subscriber Line
DVD—Digital Video Disk
DVD-ROM—DVD Read Only Memory
EEPROM—Electrically Erasable Read Only Memory
EPROM—Erasable Read Only Memory
ESN—Electronic Serial Number
FiOS—Fiber Optic Service
IMSI—International Mobile Station Identifier
IP—Internet Protocol
IP-BTS—Internet Protocol-Base Transceiver System
IR—Infrared
ISP—Internet Service Provider
LAN—Local Area Network
MDN—Mobile Directory Number
MIN—Mobile Identification Number
MS—Mobile Station
MSC—Mobile Switching Center
PBX—Private Branch Exchange
PC—Personal Computer
PCS—Personal Communication Service
PCF—Packet Control Function
PDSN—Packet Data Serving Node
PN—Pseudorandom Noise
PPP—Point-to-Point Protocol
PSTN—Public Switched Telephone Network
RAM—Random Access Memory
RF—Radio Frequency
ROM—Read Only Memory
SIP—Session Initiation Protocol
TOD—Time of Day
VoIP—Voice over Internet Protocol
WGW—Wireless Gateway
WSS—Wireless Soft Switch

What is claimed is:

1. A method of operating a femtocell on a premises of a customer of a mobile network service provider operating a public macro mobile communication network,
wherein the femtocell is configured to be able to broadcast a pilot beacon signal on each of a plurality of carrier frequencies used for pilot channels by base stations of a region of the public macro mobile communication network including the customer premises,
the method comprising steps of:
automatically detecting a mobile station identifier associated with each respective one of one or more mobile stations from a signal communicated over-the-air by the respective one of the one or more mobile stations;
maintaining a record of the one or more detected mobile station identifiers, in storage in the femtocell, for identifying each of the one or more mobile stations associated with a respective stored mobile station identifier as a mobile station expected to utilize the femtocell; and
prioritizing a sequence of hopping through said carrier frequencies for transmission of pilot beacon signals by the femtocell, based on the identification of the one or more mobile stations expected to utilize the femtocell and on a time of day or a time of week.

2. The method of claim 1, wherein:
the maintaining step comprises maintaining a list record identifying only one mobile station as the only mobile station expected to utilize the femtocell, and
the prioritizing step comprises limiting pilot beacon signal transmissions from the femtocell to only one of said carrier frequencies, the one carrier frequency corresponding to the one identified mobile station.

3. The method of claim 1, wherein:
the step of maintaining comprises maintaining a list record identifying a plurality of mobile stations as mobile stations expected to utilize the femtocell, and
the prioritizing step comprises steps of:
(a) identifying one or more of said carrier frequencies as corresponding to the identified mobile stations; and
(b) limiting pilot beacon signal transmissions from the femtocell to only the one or more identified carrier frequencies corresponding to the identified mobile stations.

4. The method of claim 3, wherein:
the one or more identified carrier frequencies corresponding to the identified mobile stations include a plurality but not all of the carrier frequencies used for pilot channels by base stations of the region of the public macro mobile communication network;
the step of limiting pilot beacon signal transmissions comprises repeatedly cycling through the identified plurality of carrier frequencies in sequence to transmit pilot beacon signals on the identified carrier frequencies, without transmitting a pilot beacon signal on any other of the carrier frequencies used for pilot channels by base stations of the region of the public macro mobile communication network.

5. The method of claim 4, further comprising steps of:
temporarily interrupting the repeated cycling through the identified plurality of carrier frequencies; and
during the interruption, cycling through a plurality of carrier frequencies in sequence to transmit pilot beacon signals thereon, including on each other one of the carrier frequencies used for pilot channels by base stations of the region of the public macro mobile communication network.

6. The method of claim 1, further comprising steps of:
temporarily interrupting the prioritized transmission of pilot beacon signals; and
during the interruption, hopping through and transmitting a pilot beacon signal of the femtocell on all of the carrier frequencies used for pilot channels by base stations of the region of the public macro mobile communication network.

7. The method of claim 1, wherein:
the method further comprises processing each detected mobile station identifier to identify a corresponding one of said carrier frequencies, and
the prioritizing step limits pilot beacon signal transmissions of the femtocell to the one or more identified carrier frequencies for at least a substantial portion of time of operations of the femtocell.

8. The method of claim 1, wherein the prioritizing step comprises:
provisioning the femtocell with information identifying one of said carrier frequencies corresponding to each respective one of the one or more mobile stations, and
limiting pilot beacon signal transmissions of the femtocell to the one or more identified carrier frequencies for at least a substantial portion of time of operations of the femtocell.

9. A femtocell for providing wireless communication on a premises of a customer of a mobile network service provider operating a public macro mobile communication network, the femtocell comprising:
a transceiver system for two-way wireless communication with one or more mobile stations;
a data interface, for packet data communication via a wide area packet data network;
a controller for controlling mobile station communications through the transceiver and the data interface; and
at least one memory, storing programming for execution by the controller, wherein:
the femtocell is capable of broadcast transmission of a pilot beacon signal on each of a plurality of carrier frequencies used for pilot channels by base stations of a region of the public macro mobile communication network including the customer premises, and
upon execution of the programming by the controller, the controller controls operations of the femtocell in such a manner that the femtocell implements functions including:
automatically detecting a mobile station identifier associated with each respective one of one or more mobile stations from a signal communicated over-the-air by the respective one of the one or more mobile stations, via the transceiver system;
maintaining a record of the one or more detected mobile station identifiers, in memory, for identifying each of the one or more mobile stations associated with a respective stored mobile station identifier as a mobile station expected to utilize the femtocell; and
prioritizing a sequence of hopping through said carrier frequencies for transmission of pilot beacon signals by the femtocell, based on the identification of the one or more mobile stations expected to utilize the femtocell and on a time of day or a time of week.

10. The femtocell of claim 9, wherein execution of the programming by the controller causes the controller to control operations of the femtocell in such a manner that the femtocell implements further functions including:
temporarily interrupting the prioritized transmission of pilot beacon signals; and
during the interruption, hopping through and transmitting a pilot beacon signal of the femtocell on all of the carrier frequencies used for pilot channels by base stations of the region of the public macro mobile communication network.

11. The femtocell of claim 9, wherein:
the functions implemented by the femtocell during execution of the programming by the controller further comprise processing each detected mobile station identifier to identify a corresponding one of said carrier frequencies, and
the function of prioritizing limits pilot beacon signal transmissions of the femtocell to the one or more identified carrier frequencies for at least a substantial portion of time of operations of the femtocell.

12. The femtocell of claim 9, wherein:
the function of maintaining comprises receiving provisioning information identifying one of said carrier frequencies corresponding to each respective one of the one or more mobile stations, and
the function of prioritizing limits pilot beacon signal transmissions of the femtocell to the one or more identified carrier frequencies for at least a substantial portion of time of operations of the femtocell.

13. An article of manufacture, comprising:
a tangible non-transitory machine readable storage medium; and
programming embodied in the storage medium, configured for execution by a controller of a femtocell for providing wireless communication on a premises of a customer of a mobile network service provider operating a public macro mobile communication network,
the femtocell being configured to be able to broadcast a pilot beacon signal on each of a plurality of carrier frequencies used for pilot channels by base stations of a region of the public macro mobile communication network including the customer premises,
wherein execution of the programming by the controller of the femtocell causes the femtocell to implement functions comprising:
automatically detecting a mobile station identifier associated with each respective one of one or more mobile stations from a signal communicated over-the-air by the respective one of the one or more mobile stations;
maintaining a record of the one or more detected mobile station identifiers, in storage in the femtocell, for identifying each of the one or more mobile stations associated with a respective stored mobile station identifier as a mobile station expected to utilize the femtocell; and
prioritizing a sequence of hopping through said carrier frequencies for transmission of pilot beacon signals by the femtocell, based on the identification of the one or more mobile stations expected to utilize the femtocell and on a time of day or a time of week.

14. The method of claim 1, wherein the step of automatically detecting a mobile station identifier is performed by the femtocell during an initial start up period.

15. The femtocell of claim 9, wherein the function of automatically detecting a mobile station identifier is performed by the femtocell during an initial start up period.

16. The method of claim 1, further comprising a step of:
transmitting a pilot beacon signal on each of the plurality of carrier frequencies used for pilot channels by base stations of the region of the public macro mobile communication network including the customer premises at initial power-up of the femtocell.

17. The femtocell of claim 9, wherein execution of the programming by the controller causes the controller to control operations of the femtocell in such a manner that the femtocell implements further functions including:
transmitting a pilot beacon signal on each of the plurality of carrier frequencies used for pilot channels by base stations of the region of the public macro mobile communication network including the customer premises at initial power-up of the femtocell.

18. The method of claim 1, wherein the femtocell is associated with a customer record identifying one or more mobile stations under the customer's account, the method further comprising the step of:
receiving, at the femtocell associated with the customer record, at least one of a mobile station identifier and a carrier frequency information for the one or more mobile stations under the customer's account, wherein the prioritizing step prioritizes the sequence of hopping based on the identification of the one or more mobile stations expected to utilize the femtocell and the identification of the ode or more mobile stations under the customer's account.

19. The femtocell of claim 8, wherein:

the femtocell is associated with a customer record identifying one or more mobile stations under the customer's account, execution of the programming by the controller causes the controller to control operations of the femtocell in such a manner that the femtocell implements further functions including receiving, at the femtocell associated with the customer record, at least one of a mobile station identifier and a carrier frequency information for the one or more mobile stations under the customer's account, and the function of prioritizing the sequence of hopping further comprises prioritizing the sequence of hopping based on the identification of the one or more mobile stations expected to utilize the femtocell and the identification of the one or more mobile stations under the customer's account.

20. The method of claim 1, wherein the step of prioritizing the sequence of hopping based on a time of day or a time of week step-further comprises prioritizing the sequence of hopping through said carrier frequencies for transmission of pilot beacon signals by the femtocell, based on a scheduled time that one or more of the mobile stations are expected to utilize the femtocell.

21. The femtocell of claim 9, wherein the function of prioritizing the sequence of hopping based on a time of day or a time of week further comprises prioritizing the sequence of hopping through said carrier frequencies for transmission of pilot beacon signals by the femtocell, based on a scheduled time that one or more of the mobile stations are expected to utilize the femtocell.

22. The method of claim 1, further comprising:

determining that one or more of the mobile stations expected to utilize the femtocell have not communicated with the femtocell for a period of time; and reprioritizing the sequence of hopping through said carrier frequencies for transmission of pilot beacon signals by the femtocell, based on the identification of the one or more mobile stations determined not to have communicated with the femtocell for the period of time.

23. The femtocell of claim 9, wherein execution of the programming by the controller causes the controller to control operations of the femtocell in such a manner that the femtocell implements further functions including:

determining that one or more of the mobile stations expected to utilize the femtocell have not communicated with the femtocell for a period of time; and reprioritizing the sequence of hopping through said carrier frequencies for transmission of pilot beacon signals by the femtocell, based on the identification of the one or more mobile stations determined not to have communicated with the femtocell for the period of time.

\* \* \* \* \*